US009019579B2

(12) United States Patent
Osakabe (10) Patent No.: US 9,019,579 B2
(45) Date of Patent: Apr. 28, 2015

(54) IMAGE READING APPARATUS (71) Applicant: Yoshinori Osakabe, Seto (JP)

(72) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/076,790

(22) Filed: Nov. 11, 2013

(65) Prior Publication Data

US 2014/0139895 A1 May 22, 2014

(30) Foreign Application Priority Data

Nov. 22, 2012 (JP) ................................. 2012-255866

(51) Int. Cl.
*H04N 1/04* (2006.01)
*H04N 1/00* (2006.01)

(52) U.S. Cl.
CPC ................................ *H04N 1/00615* (2013.01)

(58) Field of Classification Search
USPC .................. 358/498, 497, 496, 474
See application file for complete search history.

(56) References Cited

U.S. PATENT DOCUMENTS

| 6,640,082 B2 * | 10/2003 | Mitomi ......................... 399/374 |
| 2004/0223796 A1 * | 11/2004 | Iwata ............................ 399/367 |
| 2013/0003139 A1 | 1/2013 | Osakabe |

FOREIGN PATENT DOCUMENTS

| JP | 3751874 B2 | 3/2006 |
| JP | 3904978 B2 | 4/2007 |
| JP | 4423952 B2 | 3/2010 |
| JP | 2013-016886 A | 1/2013 |

* cited by examiner

*Primary Examiner* — Houshang Safaipour
(74) *Attorney, Agent, or Firm* — Banner & Witcoff, Ltd.

(57) ABSTRACT

An image reading apparatus includes: a cover; a conveyor disposed to the cover and including a conveyance mechanism; a first platen configured to come into contact with a first side of the document conveyed by the conveyance mechanism; a first presser disposed below the first platen for pressing a second side of the document conveyed by the conveyance mechanism toward the first platen; a movable reading device for reading an image of the document on a document table while moving below the document table; a stationary reading device disposed above the first platen for reading an image of the document conveyed by the conveyance mechanism; and a first urging member for urging the first presser toward the first platen. The first platen and the first presser are spaced from each other when the document cover is opened.

12 Claims, 9 Drawing Sheets

FIG. 6

IMAGE READING APPARATUS

CROSS-REFERENCE TO RELATED APPLICATIONS

This application claims priority from Japanese Patent Application No. 2012-255866 filed on Nov. 22, 2012, the entire subject matter of which is incorporated herein by reference.

TECHNICAL FIELD

Illustrative aspects of the present invention relate to an image reading apparatus to be mounted to a scanner, a printer, a photocopier, a facsimile machine or a multi-function device having multiple functions including scanning, printing, photocopying and/or faxing.

BACKGROUND

There have been known scanners, printers, photocopiers and multi-function devices having multiple functions including scanning, printing, photocopying and/or faxing, each of which includes: a platen, e.g. of transparent glass, for placing a document thereon; a reader unit including an image sensor arranged below the platen and to read an image of a document while moving below the platen; and an automatic document feeder (ADF) disposed above the reader unit and including a stationary image sensor for reading an image of a document being conveyed.

For the image reading apparatus having such movable and stationary image sensors, it is required to carry out shading correction before reading images on both the movable and stationary image sensors.

In this connection, there has been proposed a technique for performing white level correction (e.g., shading correction) by arranging a fixed abutment member having a slant surface in a position facing a stationary image sensor such that the stationary image sensor is configured to read a white reference formed on the abutment member.

SUMMARY

Illustrative aspects of the present invention provide an image reading apparatus which is able to suppress an occurrence of fault of a stationary reading mechanism, which is disposed to a cover for reading document images, by mitigating an impact to be applied to the stationary reading mechanism upon opening and closing the cover.

According to one illustrative aspect of the present invention, there is provided an image reading apparatus comprising: a document table configured to support a document; a cover configured to be movable between a first position for opening the document table and a second position for covering the document table; a conveyor disposed to the cover and comprising a conveyance mechanism configured to convey a document along a predetermined conveyance path; a first platen configured to come into contact with a first side of the document conveyed by the conveyance mechanism; a first presser that is disposed below the first platen so as to face the first platen through the conveyance path and is configured to press a second side of the document, which is conveyed by the conveyance mechanism, toward the first platen; a movable reading device configured to read an image of the document placed on the document table while moving below the document table; a stationary reading device that is disposed above the first platen and is configured to read an image of the document conveyed by the conveyance mechanism; and a first urging member configured to urge the first presser toward the first platen, wherein the first platen and the first presser are configured to be spaced from each other when the cover is moved to the first position.

BRIEF DESCRIPTION OF THE DRAWINGS

FIG. 7A is an enlarged sectional view taken along a line A-A in FIG. 2 of a main part in a state the document cover is closed.

FIG. 8A is an enlarged sectional view taken along a line A-A in FIG. 2 of a main part in a state the document cover is closed, FIG. 9A is an enlarged sectional view taken along a line A-A in FIG. 2 of a main part in a state the document cover is closed.

DETAILED DESCRIPTION

<General Overview>

The related-art automatic document feeder is mounted to a document cover arranged to cover the upper surface of the platen. By opening the document cover together with the automatic document feeder relatively to the reader unit, the platen is exposed at its upper surface so that a document can be placed on the platen and an image thereof be read by the movable image sensor. In this manner, the stationary image sensor in the automatic document feeder is arranged to be brought distant from and close to the abutment member as the document cover (and the automatic document feeder) is opened and closed relatively to the reader unit.

Meanwhile, the abutment member is fixed in position. For example, after a document whose image has been completed read out is taken from the platen, the document cover in certain cases is closed with great force. In such a case, the stationary image sensor might hit against the abutment member with great force, the impact of which possibly cause damage to the stationary image sensor.

Therefore, illustrative aspects of the present invention provide an image reading apparatus which is able to suppress an occurrence of fault of a stationary reading mechanism, which is disposed to a cover for reading document images, by mitigating an impact to be applied to the stationary reading mechanism upon opening and closing the cover.

According to one illustrative aspect of the present invention, there may be provided an image reading apparatus comprising: a document table configured to support a document; a cover configured to be movable between a first position for opening the document table and a second position for covering the document table; a conveyor disposed to the cover and comprising a conveyance mechanism configured to convey a document along a predetermined conveyance path; a first platen configured to come into contact with a first side of the document conveyed by the conveyance mechanism; a first presser that is disposed below the first platen so as to face the first platen through the conveyance path and is configured to press a second side of the document, which is conveyed by the conveyance mechanism, toward the first platen; a movable reading device configured to read an image of the document placed on the document table while moving below the document table; a stationary reading device that is disposed above the first platen and is configured to read an image of the document conveyed by the conveyance mechanism; and a first urging member configured to urge the first presser toward the first platen, wherein the first platen and the first presser are configured to be spaced from each other when the cover is moved to the first position.

According thereto, even in case the cover goes into contact with the first presser with great force upon closing the cover relatively to the document table, the first presser is able to retract in a direction of load application by the arrangement of the first urging member. This mitigates the application of impact to the stationary reading device and first presser due to a movement of the cover in a closing direction thereof, and hence it is possible to suppress an occurrence of fault.

According to another illustrative aspect of the present invention, in the image reading apparatus, the first urging member may be disposed at one point for the first presser.

According thereto, the first presser is disposed swingable without restriction in a main scanning direction of the stationary reading device. Even in the case the stationary reading device is changed inclined by an incorrect closure or deformation of the cover, the first presser can follow the inclination.

According to still another illustrative aspect of the present invention, in the image reading apparatus, the movable reading device may comprise: a second platen configured to come into contact with the second side of the document conveyed by the conveyance mechanism; and a second presser that is disposed above the second platen and is configured to press the second side of the document, which is conveyed by the conveyance mechanism, toward the second platen. When reading images out of both sides of the document conveyed by the conveyance mechanism, the movable reading device may move to below the second platen. The image reading apparatus may further comprise a second urging member configured to urge the second presser toward the second platen. The second platen and the second presser may be configured to be spaced from each other when the cover is moved to the first position.

According to the image reading apparatus, the movable reading device is located to face the conveyance path from the first platen and the stationary reading device are arranged opposite with reference to the conveyance path. Thus, images can be read out of a document at its main and back surfaces under the same conditions.

According to still another illustrative aspect of the present invention, the image reading apparatus may further comprise: a white reference member that is disposed on a surface of the first presser facing the first platen, the stationary reading device being configured to use the white reference member for performing various corrections; a detector configured to detect an open/close state of the cover relative to the document table; and a control device configured to, in a case where the cover is detected to be open relatively to the document table, control the image reading apparatus not to perform the various corrections.

According to the image reading apparatus, image-reading quality can be suppressed from lowering under control of the control section in a manner regulating various corrections in the state that the distance is improper between the stationary reading device and the white reference member.

According to still another illustrative aspect of the present invention, the image reading apparatus may further comprise: a reader housing that houses the document table and the movable reading device. The cover may be swingably supported on the reader housing about a rotation axis extending along a first edge of the reader housing. The detector may be disposed to the reader housing at a position closer to the second platen than the document table, the position being around a second edge other than the first edge and being away from the first platen and the second platen.

According to the image reading apparatus, it is possible to detect an opening/closing state of the cover by using the detector. Further, since the detector is disposed to a position nearby a position where the stationary reading device is configured to be arranged, relationship between the stationary reading device and the detector with respect to an opening angle of the cover can be substantially the same. Therefore, it is possible to accurately detect that the reader unit is not closed by the cover. Specifically, it is possible to accurately detect that the stationary reading device is in an improper state for reading the white reference member.

According to still another illustrative aspect of the present invention, in the image reading apparatus, each of the first presser and the second presser may be made up of a common component.

According to the image reading apparatus, the common use of components is contributable to a reduction of component management cost. Particularly, a white reference member can be arranged also in the second presser, which can be used to make white a background of an image whose document is narrow in width.

According to still another illustrative aspect of the present invention, in the image reading apparatus, the second platen and the document table may be made up of single member.

According to the image reading apparatus, the number of components can be reduced as compared to the case the second platen is formed as a separate component.

According to the illustrative aspects of the invention, the impact to the stationary reading device is mitigated so that it is possible to suppress an occurrence of fault in the stationary reading device.

<Exemplary Embodiments>

Exemplary embodiments of the present will now be described with reference to the drawings.

An image reading apparatus according to one mode of the present invention will be described with the application thereof to a multi-function device. In this case, the image reading apparatus exemplified in the mode is configured as part of a multi-function device having a function (of scanning) of an image reading apparatus and, in addition, other functions (e.g. printing, copying, and facsimile transmission and reception). The mode presented below is a suitable example of an image reading apparatus according to the invention and in certain cases is variously restricted to technically preferable aspects, wherein the aspects are not intended to restrict the technical scope of the invention unless otherwise clarified to limit the invention. The mode includes constituent elements that are to be suitably replaced with existing ones and to be provided in a variety of forms including combinations with existing constituent elements. For this reason, the mode below is not to be construed in a manner restricting the invention claimed. In the following, various parts of a multi-function device are explained by use of directional indications of up, down, left, right, front and rear given in each figure in order to facilitate understanding the relative positional relationship of the parts.

[Exterior Structure of the Multi-Function Device]

Figure 1:
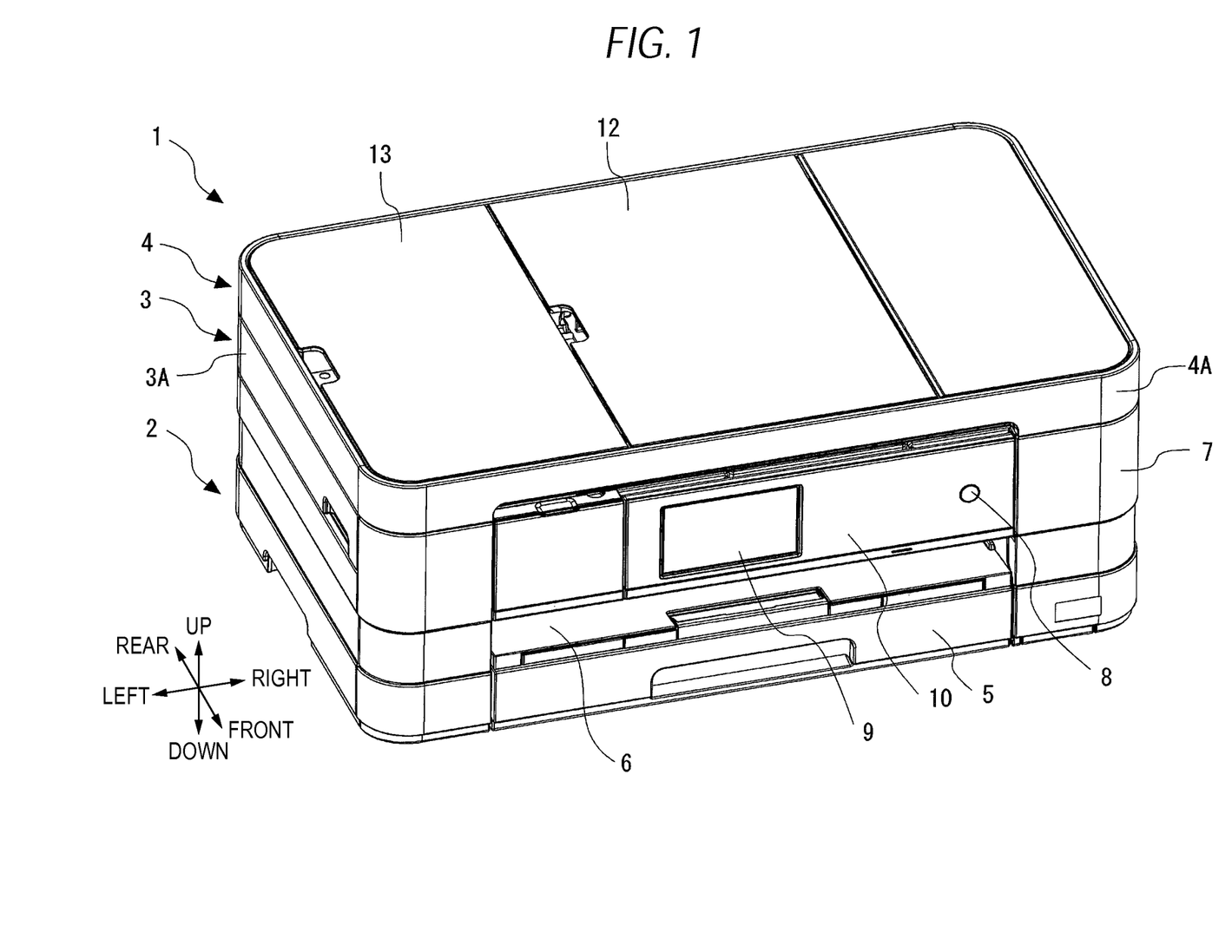
FIG. 1 is an overall perspective view of a multi-function device showing an example thereof mounted with an image reading apparatus applied to one mode according to the present invention.
Figure 2:
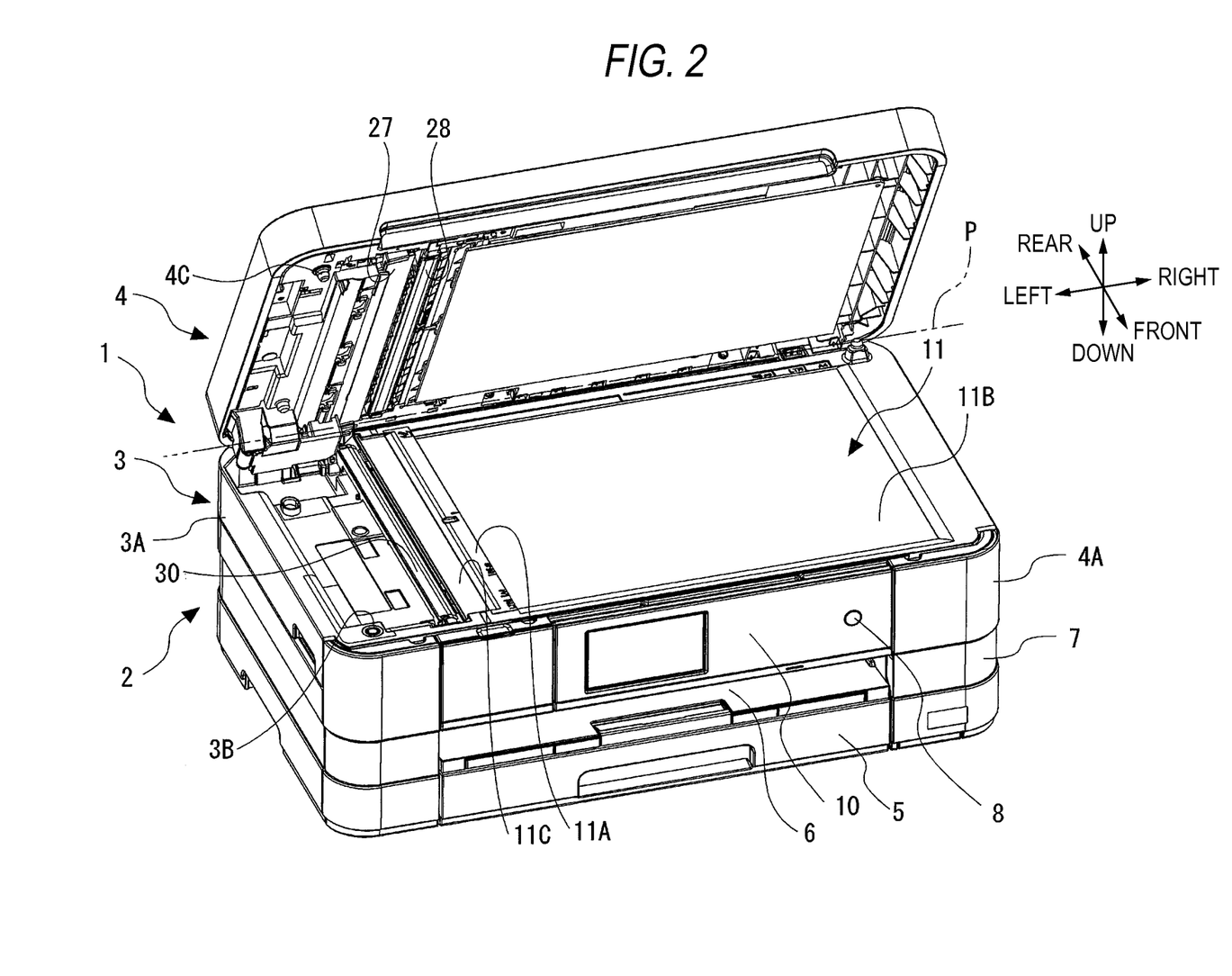
FIG. 2 is a perspective view of the multi-function device mounted with the image reading apparatus applied to the one mode according to the invention, in which a document cover is open relatively to a main body unit.

A multi-function device 1 includes a main body unit 2, a reader unit 3 mounted on the main body unit 2 and a document cover 4 mounted on the reader unit 3, as shown in FIGS. 1 and 2.

The main body unit 2 incorporates principal functional sections for image forming of the multi-function device 1, including an image forming section, a control section and a power source section. The main body unit 2, the reader unit 3 and the document cover 4 are arranged with various drive mechanisms that are to be put under control of mainly a control section disposed in the main body unit 2. In the front of the main body unit 2 or toward this in the figure, there are a drawer-type recording paper cassette 5 in a lower stage, a paper output port 6 made open in a middle stage and configured to output a recording paper after an image is formed, a front cover 7 disposed in an upper stage and covering the front of the reader unit 3, and a controller 10 arranged centrally in the upper stage and having a switch 8 and a touch panel type liquid-crystal display panel 9. Incidentally, a transfer-paper cassette 5 can be made available as an option and, in certain cases, not arranged.

The reader unit 3 is structured to open and close relatively to the main body unit 2 about an axis (not shown) extending left and right in the figure, at a backside (or at a rear in the figure) of the main body unit 2 and reader unit 3.

In case the reader unit 3 is moved to an open position, the main body unit 2 is exposed at the upper to permit maintenance operation or so of the image forming section, control section, power-source section or the like, not shown, incorporated in the main body unit 2.

Figure 3:
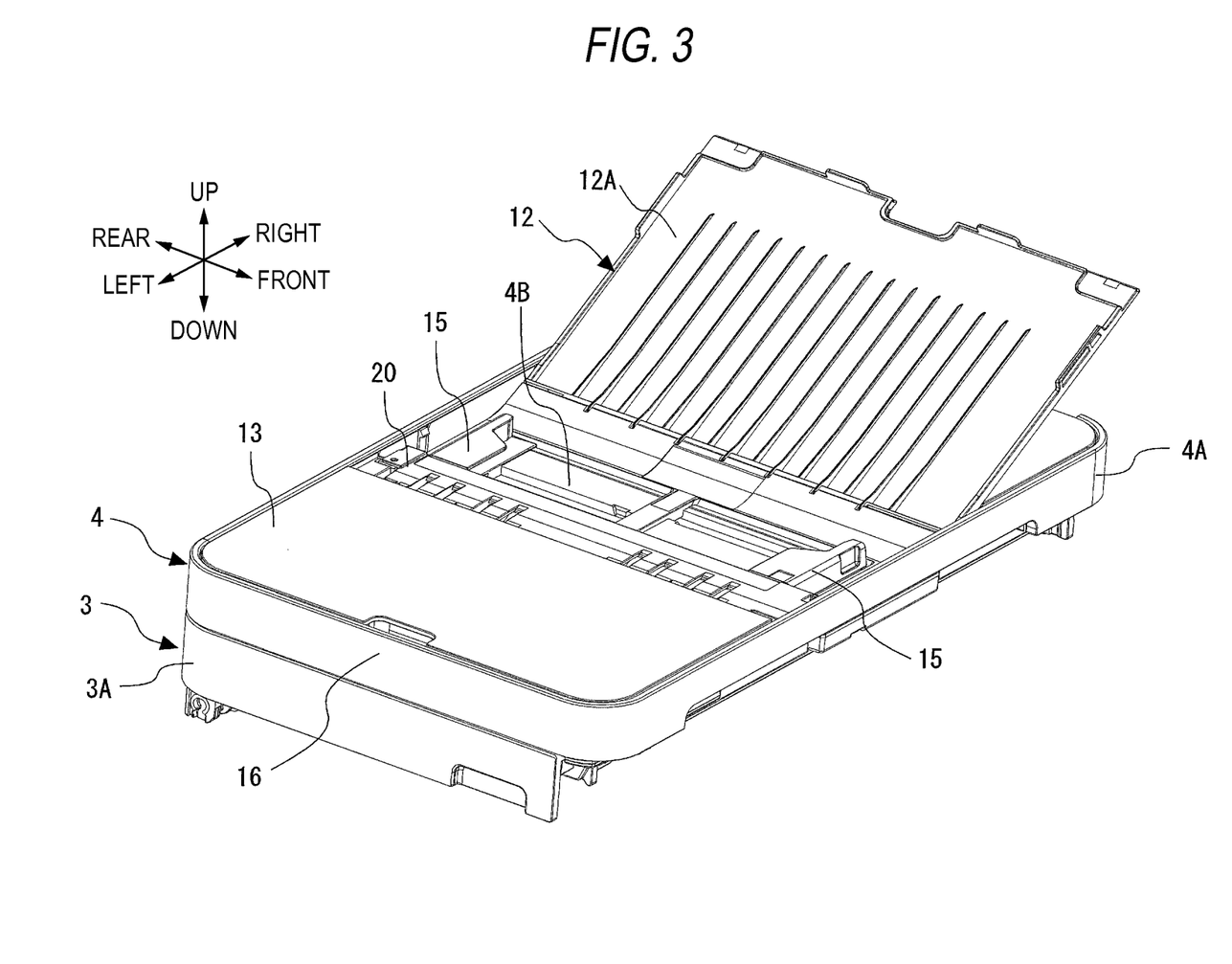
FIG. 3 is a perspective view of the document cover mounted with the image reading apparatus applied to the one mode according to the invention.

The document cover 4 is configured to open and close relatively to the reader unit 3 about a rotation axis P extending left and right at a backside of the reader unit 3 and document cover 4, as shown in FIG. 2. Thus, the document cover 4 is to be moved to a closed position where covers a platen 11, e.g. of a transparent glass, disposed at the top of the reader unit 3 (hereinafter, referred to as "closed" in status) as shown in FIG. 1 and to an open position where the platen 11 is exposed as shown in FIG. 2. The document cover 4, when closed relatively to the platen 11, serves as a cover configured to cover the platen 11 provided as a document table. The document cover 4 is mounted with an automatic document feeder (hereinafter, referred to as an ADF). The document cover 4 has, centrally of its top surface, a document lid 12 to open and close. By fully opening the document lid 12 as shown in FIG. 3, the document lid 12 serves as a document tray 12A for placing thereon documents to be conveyed by the ADF. In the document cover 4 one pair of guides 15 are found, if fully opening the document lid 12, disposed to position two sides widthwise of a document orthogonal to a conveyance direction of the document, in a manner suppressing the document from skewing during conveyance. The one pair of guides 15 are interlinked together to move close to and away from each other, e.g. to be shifted in position between a preset maximum width, e.g. A4 size, and a preset minimum width, e.g. business card size, in a stepless or stepwise fashion. An ADF lid 13 is disposed to the document cover 4 in a position closer to one side surface and adjacent the document lid 12 closed, wherein the ADF lid is normally closed and can be opened during maintenance or upon removal of a document jammed in the course of conveyance. The ADF cover 13 may be arranged to open-and-close or removably so long as a conveyance path, which will be described later, disposed below is opened.

[Detailed Structure of the Reader Unit 3 and Document Cover 4]

Figure 4:
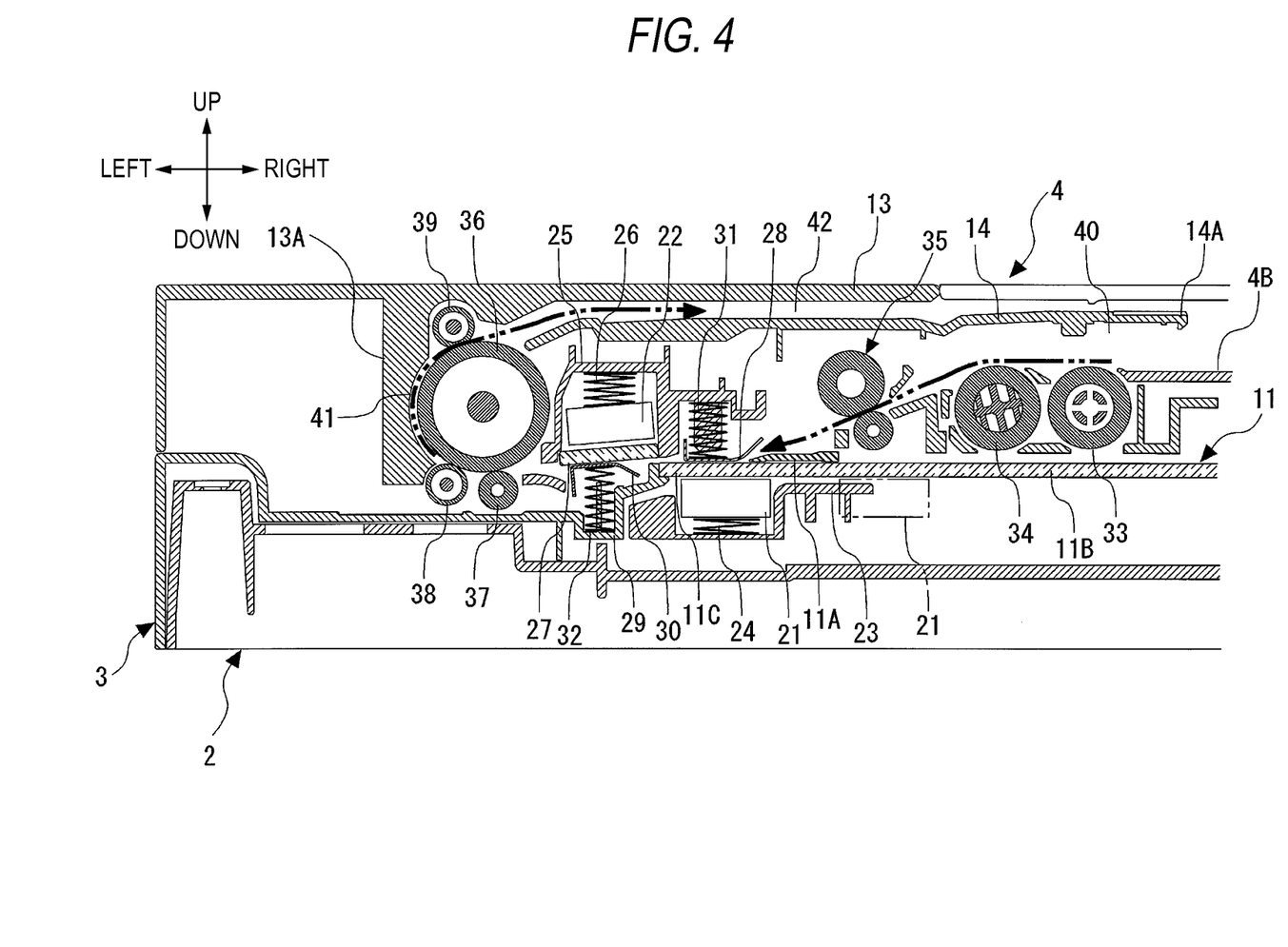
FIG. 4 is a sectional view of a main part around an image reading section of the multi-function device mounted with the image reading apparatus applied to the one mode according to the invention.

Referring to FIG. 4, structures of the reader unit 3 and the document cover 4 will be described. The explanation given below is based on an assumption that a document is conveyed toward a downstream side in a document conveyance direction (see the bold two-dot chain line) from an upstream side.

As shown in FIG. 4, the reader unit 3 is provided with a movable image sensor 21 below the platen 11 while the document cover 4 is with a stationary image sensor 22 downstream of the movable image sensor 21. In the present mode, the movable image sensor 21 and the stationary image sensor 22 employ respectively contact image sensors.

On the platen 11, an abutment member 11A is disposed to define a reference to put in position a document to be read. With reference to the abutment member 11A, a right portion of the platen 11 is used to read a document placed on while a left portion of the platen 11 is used to read a document being conveyed as shown in FIG. 4. Incidentally, the platen 11 may use separate ones to read a document placed on and to read a document being conveyed.

The movable image sensor 21 is held in a holder 23 arranged to reciprocate left and right (or in a sub-scanning direction) in the figure within the reader unit 3 by an operation of a reading motor, not shown, and normally urged toward the platen 11 by an urging member 24 such as a coiled spring. The movable image sensor 21, during reading a document being conveyed by the ADF, stays in a position as shown by the solid lines in FIG. 4, i.e. downstream of the abutment member 11A. The movable image sensor 21, when reading a document placed on the platen 11, takes a position as shown by the chain lines in FIG. 4, i.e. upstream of the abutment member 11A. Thus, the movable image sensor 21 when reading a document on a platen 11 is in a position where to read a document on the platen 11 wherein that position is given as a movement initiation position.

The stationary image sensor 22 is held in a holder frame 25 in the document cover 4 and normally urged toward a first platen 27 by an urging member 26 such as a coiled spring. The first platen 27 is held in the holder frame 25. Note that in the explanation from now on, the portion of the platen 11 spreading upstream of the abutment member 11A is referred to as a document table 11B while the portion thereof existing downstream of the abutment member 11A is as a second platen 11C. Thus, the platen 11 is rectangular and extending long in front-rear and left-right directions, and the document table 11B is greater in size than the maximum size (e.g. A4 size) of a document which the present apparatus is able to read. The movable image sensor 21 is configured to move in left-right directions below the entire of the platen 11 so that when a document is placed on the document table 11B, the movable image sensor 21 reads an image of the document placed on an upper surface of the document table 11B while moving below the document table 11B. Meanwhile, when reading a document being conveyed, the movable image sensor 21 is at rest in the position shown in FIG. 4. In this position, the second platen 11C is opposite in position to the movable image sensor 21. The stationary image sensor 22 is arranged downstream, or leftward in the figure, of the movable image sensor 21 is at rest below the second platen 11C. The stationary image sensor 22, in a position shown in FIG. 4, is to read one side of a document being conveyed, while the movable image sensor 21 in a standstill position is to read the other side of the document under conveyance. This makes it possible to read images formed on respective sides of a document through once conveyance of an identical document.

The movable image sensor 21 is configured to upwardly read an image by arranging the platen 11 above thereof. The stationary image sensor 22 is to downwardly read an image by arranging the first platen 27 below thereof. Above the movable image sensor 21 staying in a position to read a document being conveyed, a moving-side presser 28 is held in a holder frame 25 in the document cover 4 oppositely in position with reference to the second platen 11C. Below the stationary image sensor 22, a stationary-side presser 30 is held in a holder frame 29 in the reader unit 3 oppositely in position with reference to the first platen 27. The moving-side presser 28 and the stationary-side presser 30 are urged toward the second platen 11C and the first platen 27 by urging members 31, 32 such as compression springs, respectively. This places the moving-side presser 28 in a state lightly pressing an upper surface of the second platen 11C and the stationary-side presser 30 in a state lightly pressing a lower surface of the first platen 27. The urging members 31, 32 are disposed at respective central one points widthwise (or in the main scanning direction) of the moving-side presser 28 and the stationary-side presser 30. This allows the pressers 28, 30 for the respective sensors 21, 22 to incline widthwise freely. Even in case the image sensor 21, 22 inclines due to incorrect closure or deformation of the document cover 4, the presser 28, 30 is adapted to follow such inclinations. Incidentally, the urging members 31, 32 may be provided plural in the sets for the moving-side presser 28 and stationary-side presser 30. The word "moving" in the moving-side presser 28 does not mean actual movement but to mean moving in a sense giving literal correspondence to the movable image sensor 21.

The present exemplary embodiment uses the same type of parts (e.g., common component) for the moving-side presser 28 and the stationary-side presser 30. That is, material, shape, length and so on of the parts used for the moving-side presser 28 and the stationary-side presser 30 are the same. This contributes to cost reduction, including such management cost as working and inventory control of different components. The moving-side presser 28 and the stationary-side presser 30 have respective white reference members in positions facing to the sensors 21, 22 so as to be used in various corrections such as shading correction, though not shown because of small wall thickness. Incidentally, various corrections such as shading correction include black correction and white correction.

Shading correction is specifically based on an individuality basis and every scanning, for a plurality of variation factors of reading, including light intensity unevenness of an illumination light source and pixel-based sensitivity unevenness of an image sensor in addition to light intensity of an illumination light source and pixel-based sensitivity of an image sensor, not shown. By such shading correction, a constant quality of read data can be obtained, irrespectively of peripheral service environments including reproducibility of absolute reflectance, etc. of readouts, reproducibility of repetitions, individual specificity and chronological deterioration of image sensors 21, 22 and peripheral service environments such as temperature.

Below the ADF cover 13, an upper lid 14 is arranged. The document cover 4 houses, below the upper lid 14, a document conveyance roller 33, a separation roller 34 and a pair of conveyance rollers 35. The document cover 4 also houses, downstream of the stationary image sensor 22, a turnaround drive roller 36 for conveying a document in a turnaround fashion and a plurality of follower rollers 37, 38, 39 arranged around the turnaround drive roller 36 and for nip-conveying a document cooperatively with the turnaround drive roller 36.

In case the document lid 12 is fully opened into a state serving as a document tray 12A as shown in FIG. 3, a positioning plate 4B, shown in FIG. 4, becomes connected with the document tray 12A so that the documents resting on the document tray 12A can be positioned there. By placing documents on the document tray 12A such that their front ends positioned downstream with respect to the conveyance direction can reach the document conveyance roller 33, the documents are conveyed toward the separation roller 34. By the separation roller 34, the documents are separated one at a time cooperatively with a not-shown separation pad and conveyed downstream. In the present mode, a document conveyance path is provided as follows. Namely, a document read path 40 extends from between the upstream end 14A of the upper lid 14 and the positioning plate 4B of the document cover 4 to between the turnaround drive roller 36 and the follower roller 37 by way of between the moving-side presser 28 and the second platen 11C and between the stationary-side presser 30 and the first platen 27, and is formed by these members in a below region of the upper lid 14. Meanwhile, a document turnaround path 41 is formed extending from between the turnaround drive roller 36 and the follower roller 37 to between the turnaround drive roller 36 and the follower roller 39 through between a facing part 13A disposed to the ADF cover 13 and the turnaround drive roller 36. Furthermore, a document output path 42 is formed extending from between the turnaround drive roller 36 and the follower roller 39 to between the ADF lid 13 and the upper lid 14. Thus, the movable image sensor 21 and the stationary image sensor 22 are arranged opposite with respect to the read path 40 forming the document conveyance path so that images can by read, under same conditions, out of a document main side by the movable image sensor 21 (the other side) and out of a document back side by the stationary image sensor 22 (one side). Incidentally, the members configuring the paths 40, 41, 42 are given as conveyance mechanism. Out of the members, those disposed in the document cover 4 make up a conveyor.

With this arrangement, documents to be conveyed are placed on the document tray 12A of the document lid 12 opened fully. The multi-function device 1 is instructed to perform scanning by operating the controller 10 or through remote operation from a not-shown personal computer. Incidentally, when giving instructions for scanning, the user is able to designate to read documents at one side or both sides arbitrarily.

In case the multi-function device 1 is instructed for scanning, the multi-function device 1 first executes a process to initialize various sections of the apparatus and then drives the roller groups of the document cover 4. In this case, by the document conveyance roller 33, the documents are conveyed from upstream with respect to the conveyance direction. The documents are then separated one at a time by the separation roller 34, and further conveyed toward downstream with respect to the conveyance direction.

The document separated is further conveyed downstream with respect to the conveyance direction by the paired conveyance rollers 35 and passed through between the second platen 11C and the moving-side presser 28. In the case where designated for read at both sides or at a single side with the movable image sensor 21 upon instructed for scanning, the movable image sensor 21 begins to read an image at a time that the document comes to a position confronting the movable image sensor 21. Incidentally, in the case where documents are single-sided one, the documents are placed face down on the document tray 12A from which the documents are taken out one at a time in a lower order.

Specifically, the movable image sensor 21 reads an image out of a document main side by repetitively reading a plurality of pixels arrayed in a main scanning direction out of a document moving through the position confronting the movable image sensor 21 in a sub-scanning direction, provided that the main scanning direction is taken a front-rear direction of the multi-function device 1 while the sub-scanning direction is taken a direction along the conveyance direction.

The document passed through between the second platen 11C and the moving-side presser 28 is subsequently to pass through between the second transparent part 27 for documents and the stationary-side presser 30. In the case where designated for read at both sides upon instructed for scanning, the stationary image sensor 22 begins to read an image at a time that the document comes to a position confronting the stationary image sensor 22.

Specifically, the stationary image sensor 22 reads an image out of a document back side by repetitively reading a plurality of pixels arrayed in a main scanning direction out of a document moving through the position confronting the stationary image sensor 22 in a sub-scanning direction, provided that a front-rear direction of the multi-function device 1 is taken as the main scanning direction while the document conveyance direction is taken as the sub-scanning direction.

The document, passed through between the first platen 27 and the stationary-side presser 30, arrives at the turnaround drive roller 36 and is turned around there in a manner circulating around the turnaround drive roller 36 from a lower end thereof, and then discharged through the turnaround path 41 and the output path 42. The documents conveyed along the output path 42 are piled up on an upper surface of the upper lid 14.

Meanwhile, with the multi-function device 1, an image can be read out of a document placed on the document table 11B of the platen 11. In reading an image in such a way, the document cover 4 is first opened fully and a document is placed on the document table 11B. In this state, the multi-function device 1 is instructed for scanning by operation on the controller 10 or through remote operation from a not-shown personal computer or the like.

In case the multi-function device 1 is instructed for scanning, the multi-function device 1 first executes a process to initialize various sections of the apparatus and then controls the movable image sensor 21 to read an image. Specifically, the movable image sensor 21 reads an image out of a document placed on the document table 11B by repetitively reading a plurality of pixels arrayed in a main scanning direction while moving the document in a sub-scanning direction, provided that the main scanning direction is taken a front-rear direction of the multi-function device 1 while the sub-scanning direction is taken a left-right direction.

Meanwhile, the document cover 4 has, in its bottom surface, projections 4C for detection that face to respective holes 3B disposed in an upper surface of the reader unit 3, as shown in FIG. 2. The projections 4C for detection face, at their lower ends, to the holes 3B when the document cover 4 is closed relatively to the reader unit 3, and leave the holes 3B when the document cover 4 is open relatively to the reader unit 3. This makes it possible to detect whether the platen 11 including the document table 11B is being covered, e.g., whether the platen 11 closed, by the document cover 4.

The holes 3B and the projections 4C for detection are disposed opposite in a casing 3A of the reader unit 3 and a casing 4A of the document cover 4, at an upper surface and a bottom surface, respectively. In this case, they are in locations nearby a periphery of the casing 3A, 4A and off the second platen 11C and first platen 27. Moreover, because there is a rotation axis P at a backside of the main body unit 2 about which opening and closing is to be done, it is preferable to provide them in an edge except for the edge closer to backside, particularly in a front edge or a side edge closer to front where the upper and bottom surfaces are given a spacing greater for an angle of opening. Incidentally, they can be arranged, for example, between the second platen 11C and the first platen 27.

A concrete example of a control system for the image reading apparatus according to the invention will be described based on a block diagram of FIG. 5.

In the present mode, a CPU 51, a ROM 52 and a RAM 53 are disposed, separately from the above-described control system (not shown) configured to control of various sections of the image forming apparatus. The CPU 51, the ROM 52 and the RAM 53 are connected, through a bus 54, with an operation unit 10, a display driver 55 configured to control display on the liquid-crystal display panel 9, a reading device control section 56 configured to control the image sensors 21, 22, a movable analog front end (AFE) 57 and a stationary analog front end (AFE) 58 configured to process the respective ones of image data read at the image sensors 21, 22, a motor driver 60 configured to control a conveyance motor 59 to drive the separation roller 34 and turnaround drive roller 36, etc., and a motor driver 62 configured to control a read motor 61 to move the holder 23 on which the movable image sensor 21 is held. Detection signals from a document cover sensor 63 configured to detect that the platen 11 of the reader unit 3 is being covered (or closed) by the document cover 4, a front sensor 64 configured to detect the presence/absence of a document to be conveyed by the ADF, and a rear sensor 65 configured to detect front and rear ends of a conveyed document, for example, are input to the CPU 51. The bus 54 is disposed in the main body unit 2 or the reader unit 3 and is used for communication with the image forming section 66 to form an image on a recording paper (not shown), for communication as a facsimile function and for communication with a personal computer or the like.

The ROM 52 stores various programs, including a control program for controlling the operation of the image reading apparatus. The CPU 51 is configured to control various sections according to the control program read out of the ROM 52.

Each of the image sensors 21, 22 receives the reflection light from a white reference member disposed on the presser 28, 30 and outputs to the AFE 57, 58 a readout voltage or analog signal commensurate with the amount of reception light, according to the command from the CPU 51.

The front sensor 64 is arranged upstream of the separation roller 34 and for detecting the presence/absence of a document being conveyed. The rear sensor 65 is arranged on the conveyance path and used to control the read timing of the image sensors 21, 22 or so. The rear sensor 65, when detecting a rear end of a document, acts to initiate to convey the next document in the case the next document is being set up.

Figure 6:
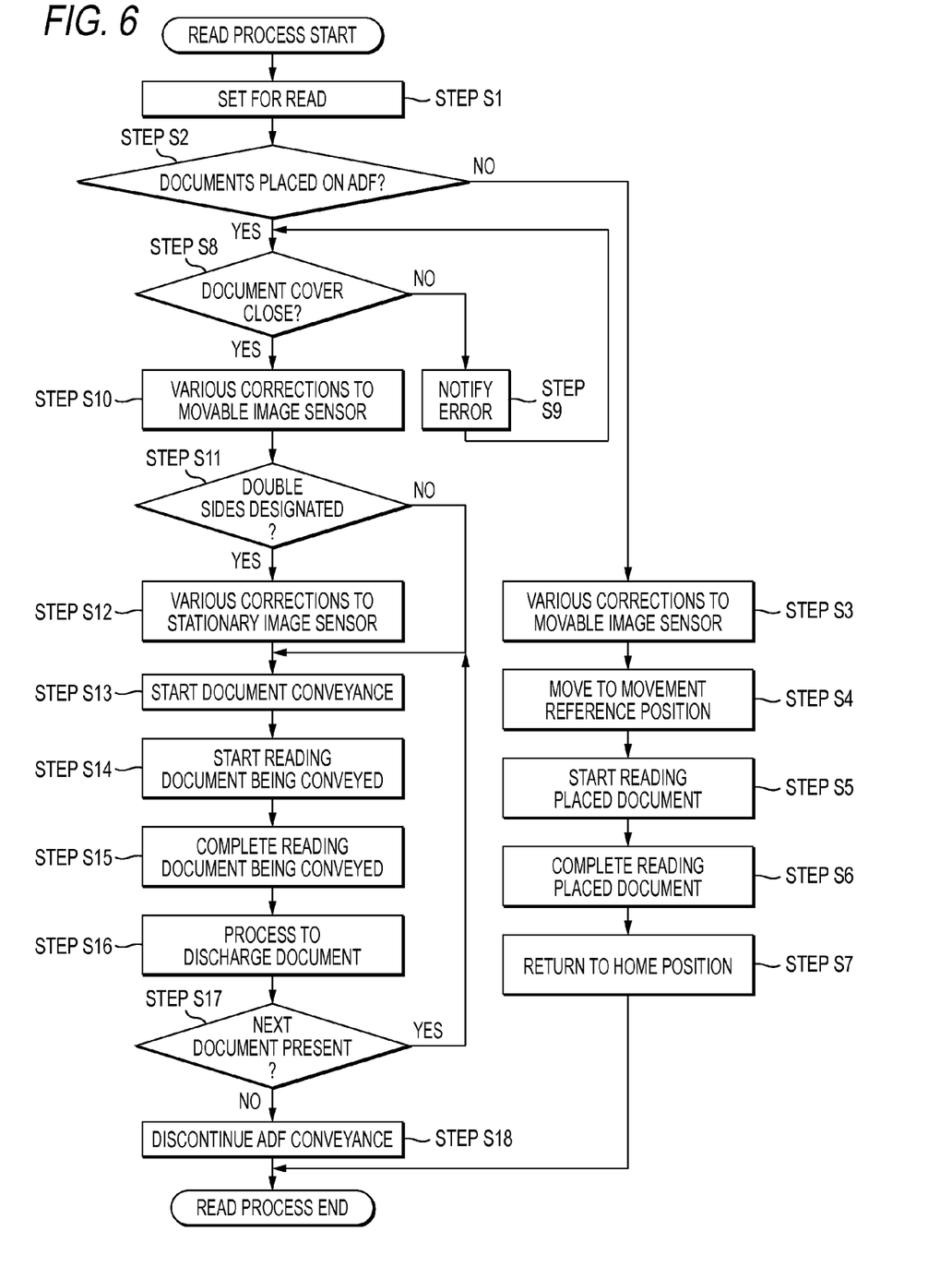
FIG. 6 is a flowchart showing a control process of image reading to be executed by a CPU of the image reading apparatus of the one mode according to the invention.

FIG. 6 is a flowchart illustrating a concrete control process for the CPU 51 to read images.

At step S1, the CPU 51 accepts an instruction for initiating to read images, according to an image-read operation on the controller 10 including the touch-panel liquid-crystal display panel 9 or to a reception of instruction signals from an external apparatus. The process moves to a preparation for executing drive control matched with the instruction, e.g. entering a standby mode and moving to step S2.

At step S2, the CPU 51 determines whether or not documents are being placed on the document tray 12A, depending upon the detection result of the front sensor 64. In case there are documents on the document tray 12A, it is determined that there is a designation to read documents with the ADF, and the process moves to step S8. In case there are no documents on the document tray 12A, it is determined instructed to read images without use of the ADF, i.e. to read images from a document positioned on the document table 11B, and the process moves to step S3.

At step S3, the CPU 51 controls the movable image sensor 21, staying in the home position (not shown), to read the white reference member that is for the moving-side presser 28 and arranged in a backside of the abutment member 11A and to perform various corrections as mentioned before, and the process moves to step S4. Incidentally, since the present exemplary embodiment uses the same type of part (e.g., common component) for the moving-side presser 28 and stationary-side presser 30, reading a white reference member here may be by use of a white reference member on the moving-side presser 28 instead that on the abutment member 11A.

At step S4, the CPU 51 controls to drive the reading motor 61 to move the movable image sensor 21, staying in the home position, to a movement-initiation position which is close to the abutment member 11A among the document table 11B shown with chain lines in FIG. 4. Then, the process moves to step S5.

At step S5, the CPU 51 controls to drive the reading motor 61 to move the movable image sensor 21 in the sub-scanning direction, to thereby read an image of the document placed on the document table 11B. Thereafter, the process moves to step S6.

At step S6, the CPU 51, when a terminal end of the document on the document table 11B is reached, completes the image reading from the document being placed, and the process moves to step S7.

At step S7, the CPU 51 controls to drive the reading motor 61 to return the movable image sensor 21 to its home position, followed by completion of the routine for reading images from the document being placed. Incidentally, in case there is a next document being placed, the routine of steps S1 to S7 is repeated.

At step S8, the CPU 51 determines whether or not the document cover 4 is being closed according to the document cover sensor 63. In case determined that the document cover 4 is being closed (Yes), the process moves to step S10. In case determined that the document cover 4 is not being closed (No), the process moves to step S9.

At step S9, the CPU 51 informs of an error indicating to close the document cover 4, through indications on the liquid-crystal display panel 9, alert sound, voices or the like, and the process returns to step S8 where this routine is monitored until the document cover 4 is closed.

At step S10, the CPU 51 controls the movable image sensor 21, staying in the home position, to read the white reference member and carries out various corrections as mentioned before similarly to the step S3, and the process moves to step S11. Incidentally, while being determined in the step S9 that the document cover 4 is not yet closed (i.e. open), the control continues monitoring with informing of an error at the step S9 without moving to the step S10. Although not moving to the step S10 specifically results in control for the CPU 51 not to perform various corrections by not reading the white reference member, the process may read the white reference member but not use a readout for various corrections. This makes it possible to regulate reading of the white reference member in the state that the distance is improperly increased between the image sensor 21, 22 and the white reference member. Thus, image reading quality is suppressed from deteriorating.

At step S11, the CPU 51 determines as a document-read scheme whether or not a designation was made on the controller 10 to read a document at both sides. In case determined designated to read a document at both sides, the process moves to step S12. In case not determined designated to read a document at both sides, the process skips the step S12 over to step S13 on the assumption designated to read a single side.

At step S12, the CPU 51 controls the stationary image sensor 22 to read the white reference member on the stationary-side presser 30 and performs various corrections as mentioned before, and the process moves to step S13. Incidentally, prior to the step S12, the control may determine whether the document cover 4 is closed similarly to the step S8 so that when open, an error indication is made without moving to the subsequent step.

At step S13, the CPU 51 controls to drive the conveyance motor 59. This rotates the rollers and initiates to convey documents. Subsequently, the process moves to step S14.

At step S14, the CPU 51, in case a single-sided document, reads an image of the document being conveyed by use of only the movable image sensor 21, staying below the second platen 11C, or, in case a double-sided document, reads an image of the document being conveyed by use of the movable and stationary image sensors 21, 22, and the process moves to step S15. Incidentally, in the case the documents in the documents tray 12A are face down (i.e. directed down) by designation on the controller 10, an image can be read out of a single-sided document by the movable image sensor 21 while in the case the documents in the document tray 12A are face up (i.e. directed up), an image can be read out of a single-sided document by the stationary image sensor 22.

At step S15, when a predetermined time has passed after a detection of a rear end by the rear sensor 65 or when a conveyance of the document for a predetermined distance is completed, the CPU 51, in case a single-sided document, reads an image of the document being conveyed by the movable image sensor 21 and, in case a double-sided document, reads an image of the document being conveyed by the image sensors 21, 22, followed by moving of the process to step S16.

At step S16, after completion of reading an image of a single-sided document being conveyed by the movable image sensor 21 or of a double-sided document being conveyed by the image sensors 21, 22, the CPU 51 controls the document to pass through the turnaround path 41 and the output path 42 and performs a predetermined document-discharge process, followed by moving of the process to step S17.

At step S17, the CPU 51 controls, for example, the front sensor 64 to determine whether or not there are documents of the next page and subsequent. In the case there is a next document, the process loops to step S13 to thereby repeat the subsequent routine until determined that there is no document. Where there is no next document, the process moves to step S18.

Figure 5:
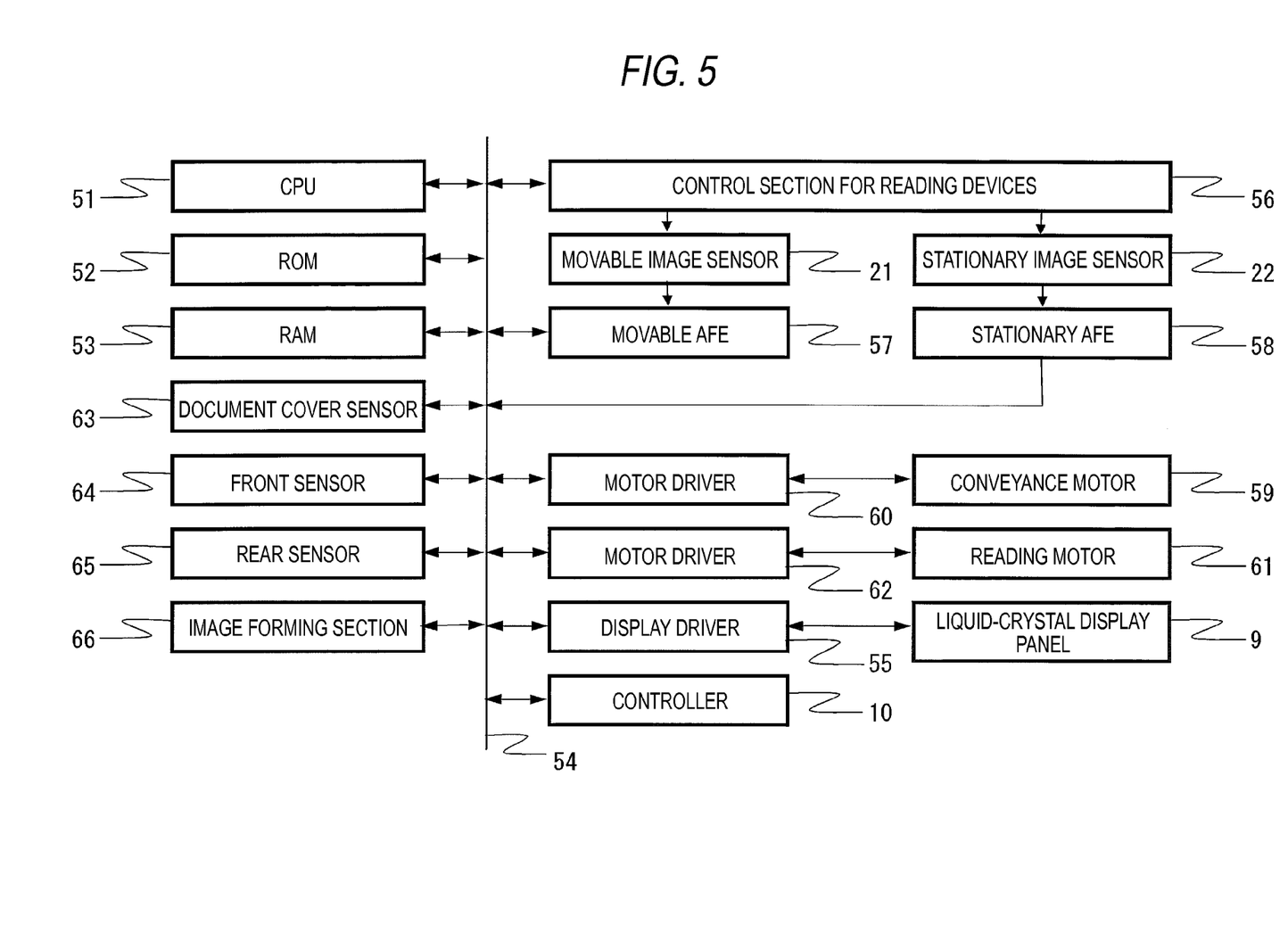
FIG. 5 is a block diagram of a control system of the image reading apparatus of the one mode according to the invention.

At step S18, the CPU 51 discontinues conveyance of documents, i.e. the operation of the drive system shown in FIG. 5, and completes this routine.

FIRST EXAMPLE

Figure 7A:
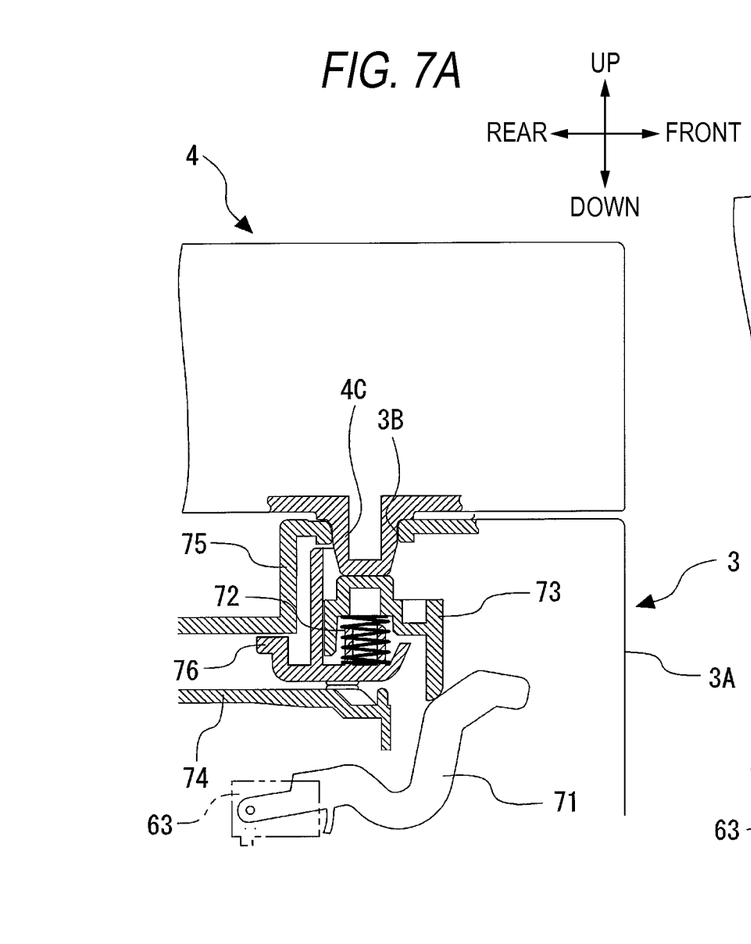
Figure 7B:
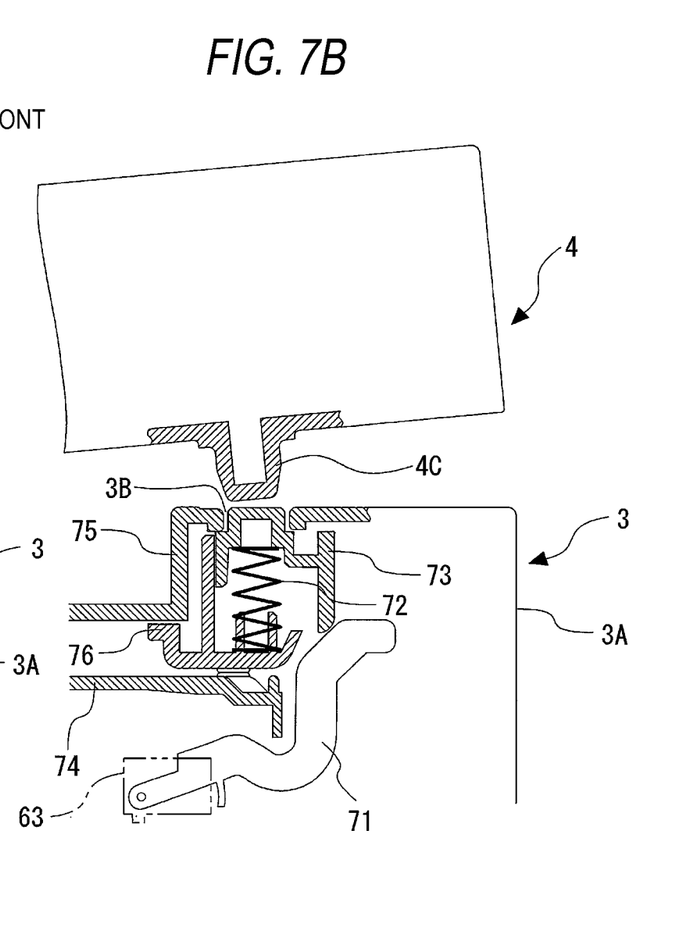
FIG. 7B is an enlarged sectional view taken along a line A-A in FIG. 2 of the main part in a state the document cover is opened, in a first example of the multi-function device mounted with the image reading apparatus applied to the one mode according to the invention.

FIGS. 7A and 7B show a first example of an image forming apparatus mounted with the image reading apparatus applied to the one mode of the present invention.

In the first example, the document cover sensor 63 (one example of a detector) is arranged within the reader unit 3. The cover sensor 63 is fixed on a main body unit (not shown) or the like. The cover sensor 63 is connected with a lower end of a bend arm 71 whose upper end is given as a free end. A portion of the bend arm 71 close to the upper end is normally in contact with a displacement member 73 urged upward by a force of the coiled spring 72. The displacement member 73 has an upper end coaxial to a hole 3B. The displacement member 73 is vertically movably supported by a dish 76 sustained by an internal frame 74, 75 supporting inner components (not shown) such as a motor of the reader unit 3. The displacement member 73 has an upper end that is placed in abutment against a projection 4C for detection and urged down against the force of the coiled spring 72 when the document cover 4 is closed.

When document cover 4 is closed, the lower end of the projection 4C for detection faces to an interior of the hole 3B as shown in FIG. 7A and presses down the displacement member 73 against the force of the coiled spring 72 to thereby push down the upper end of the bend arm 71. According thereto, the cover sensor 63 detects that the document cover 4 closes the reader unit 3.

In case the document cover 4 is opened, the lower end of the projection 4C for detection leaves the hole 3B so that the displace member 73 is pushed up by the force of the coiled spring 72 as shown in FIG. 7B and simultaneously the upper end of the bend arm 71 is also pushed up. According thereto, the document cover sensor 63 detects that the document cover 4 is open relative to the reader unit 3. Moreover, the CPU 51 controls the image reading unit not to execute various corrections, as indicated in the step S8. Thus, the projection 4C for detection and the displacement member 73 make up a set of sensor members as to the cover sensor 63.

Incidentally, it is possible to provide a certain degree of allowances to the open angle of the document cover 4 at which the document cover 4 is detected open relatively to the reader unit 3. Even if the document cover 4 is close relatively to the reader unit 3, a slight degree of incorrect closure possibly arises. However, at a certain degree of incorrect closure, there is no substantial effect upon reading a white reference member by the stationary image sensor and further upon various corrections. For this reason, it is possible to detect an opening of the document cover 4 only when the document cover 4 is open equal to or greater than a predetermined angle to the reader unit 3. For example, the predetermined open angle of the document cover 4 relative to the reader unit 3 can be established by the rotation amount of the bend arm 71 and the stroke of the cover sensor 63.

SECOND EXAMPLE

Figure 8A:
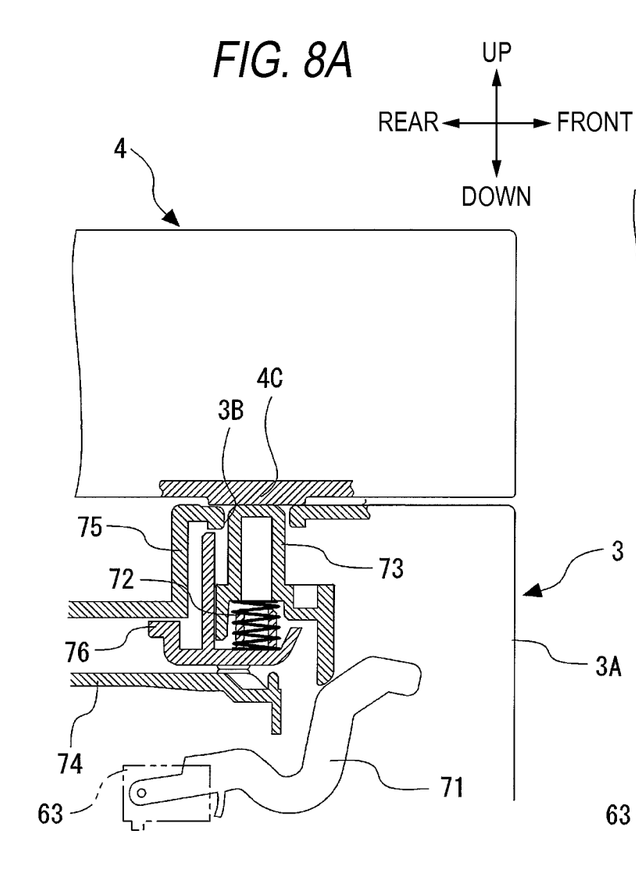
Figure 8B:
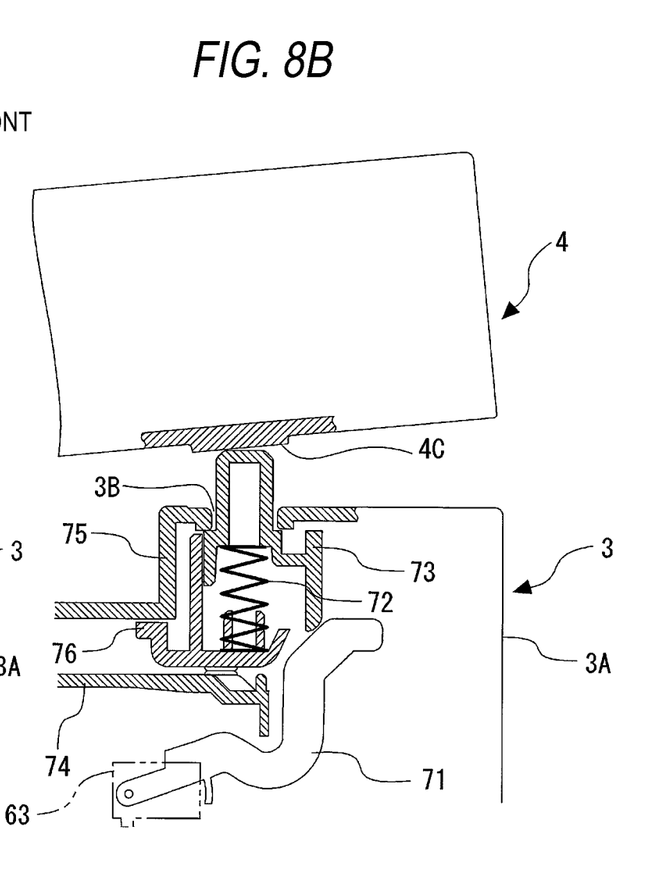
FIG. 8B is an enlarged sectional view taken along a line A-A in FIG. 2 of the main part in a state the document cover is opened, in a second example of the multi-function device mounted with the image reading apparatus applied to the one mode according to the invention.

FIGS. 8A and 8B show a second example of an image forming apparatus mounted with the image reading apparatus applied to the one mode of the present invention.

In the second example, the document cover 4 has a projection 4C for detection that is given smaller in projection amount. In a closure of the document cover 4, the lower end surface of the projection 4C for detection does not go into contact with the upper surface of the reader unit 3.

In a closure of the cover 4, the lower end of the projection 4C for detection is in contact with an upper end of a displacement member 73 protruding from the hole 3B, substantially in flush with an opening end of the hole 3B, as shown in FIG. 8A. According thereto, the cover sensor 63 detects that the document cover 4 closes the reader unit 3.

When the document cover 4 is opened, the lower end of the projection 4C for detection leaves the hole 3B as shown in FIG. 8B. By the force of the coiled spring 72, the upper end of the displacement member 73 is pushed up in a manner protruding from the hole 3B and the upper end of the bend arm 71 also is pushed up. According thereto, the cover sensor 63 detects that the document cover 4 is open relative to the reader unit 3.

THIRD EXAMPLE

Figure 9A:
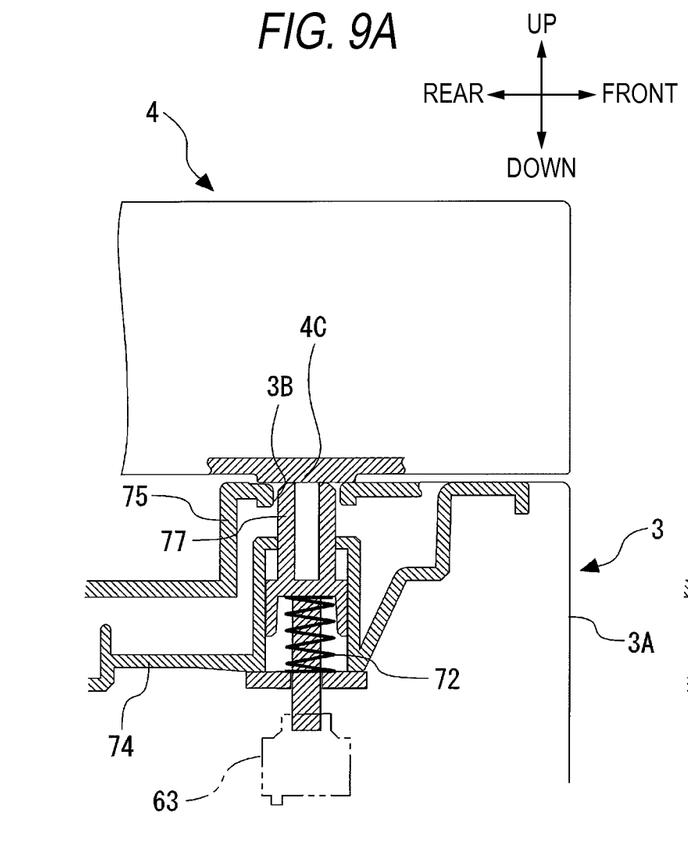
Figure 9B:
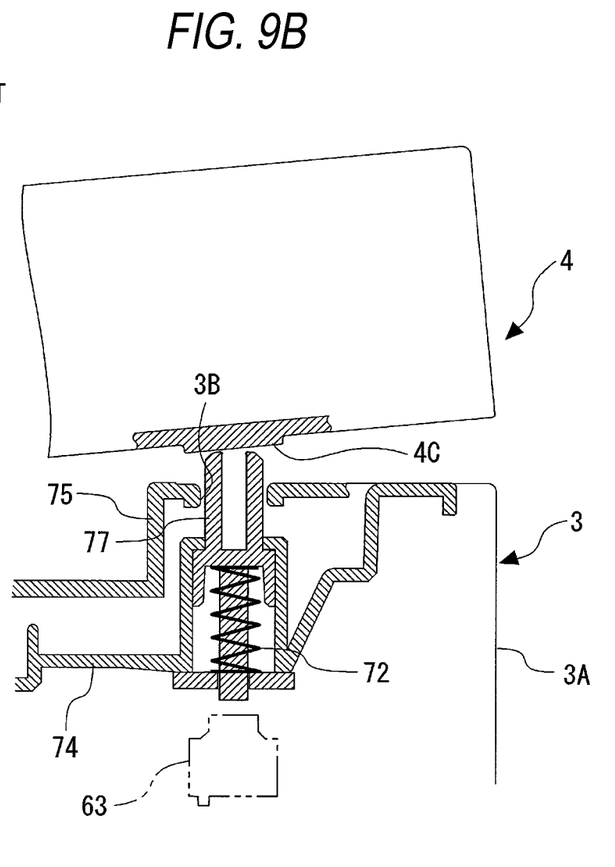
FIG. 9B is an enlarged sectional view taken along a line A-A in FIG. 2 of the main part in a state the document cover is opened, in a third example of the multi-function device mounted with the image reading apparatus applied to the one mode according to the invention.

FIGS. 9A and 9B show a third example of an image forming apparatus mounted with the image reading apparatus applied to the one mode of the present invention.

In the third example, the rotatable bend arm 71 is omitted and the cover sensor 63 is to be actuated directly by the displacement member 77.

During a closure of the document cover 4, the lower end of the projection 4C for detection is in contact with a front end of the displacement member 77 protruding from the hole 3B as shown in FIG. 9A. According thereto, the cover sensor 63 detects that the document cover 4 closes the reader unit 3.

When the document cover 4 is opened, the lower end of the projection 4C for detection leaves the hole 3B and the displacement member 77 is pushed up by the force of the coiled spring 72, as shown in FIG. 9B. According thereto, the cover sensor 63 detects that the document cover 4 is open relative to the reader unit 3. Incidentally, in the case of detecting an open state of the document cover 4 relative to the reader unit 3, a predetermined open angle can be set by the displacement amount of the displacement member 77 and the stroke of the cover sensor 63.

Thus, the image reading apparatus according to the invention includes a document table 11B configured to support a document, a document cover 4 configured to be movable to/from a position where is open and a position where is close, a conveyor that is disposed within the document cover 4 and has a conveyance mechanism made by a plurality of rollers 33-39 for moving a document along a predetermined conveyance path, a first platen 27 that is arranged to come into contact with one side of a document being conveyed by the conveyance mechanism, a stationary-side presser 30 that is arranged below and opposite to the first platen 27 with reference to the conveyance path and to press a document, being conveyed by the conveyance mechanism, at the other side toward the first platen 27, a movable image sensor 21 that is arranged to read an image of a document placed on the document table 11B while moving below the document table 11B, a stationary image sensor 22 that is arranged above the first platen 27 and to read an image of a document being conveyed by the conveyance mechanism, and an urging member 32 that arranged to urge the stationary-side presser 30 toward the first platen 27. Even in the case the document cover 4 goes into contact, with great force, with the stationary-side presser 30 when closing the document cover 4 relatively to the document table 11B due to a separation of the first platen 27 and the stationary-side presser 30 from each other upon opening of the document cover 4 relatively to the document table 11B, the stationary-side presser 30 is able to retract toward load application owing to the arrangement of the urging member 32. This makes it possible to mitigate the impact to the stationary-side image sensor 22 and stationary-side presser 30. Thus, malfunction occurrence is to be suppressed.

The movable image sensor may include a second platen 11C that is to come into contact with another side of a document being conveyed by the conveyance mechanism, and a moving-side presser 28 arranged above the second platen 11C and to press a document being conveyed by the conveyance mechanism at one side toward the second platen 11C, wherein the movable image sensor 21, when reading images from respective sides of a document, moves to below the second platen 11C, the moving-side presser 28 having an urging member 31 configured to urge toward the second platen 11C, the second platen 11C and the moving-side presser 28 being spaced from each other when the document cover 4 is opened relatively to the document table 11B. Thus, the movable image sensor 21 and the stationary image sensor 22 are arranged opposite with reference to the conveyance path 40 so that respective images on the main and back sides of a document can be read under the same conditions.

An image reading apparatus may further include a white reference member that is disposed in an opposite surface of the stationary-side presser 30 to the first platen 27 and for performing various corrections as to the stationary image sensor 22, and a cover sensor 63 that is arranged to detect an open/close state of the document cover 4 relative to the document table 11B. In the case the cover sensor 63 detects that the document cover 4 is open relative to the document table 11B, various corrections are not performed as to the stationary image sensor 22 to thereby regulate reading of the white reference member in the state the distance is improper between the stationary image sensor 22 and the white reference member. Thus, image-reading quality is suppressed from lowering.

An image reading apparatus may further include a casing 3A that has the document table 11B and the movable image sensor 21 and a document cover 4 that is rotatably supported on the casing 3A about a rotation axis extending along one edge of the casing 3A so as to open and close relatively to the document table. The cover sensor 63 has one pair of sensor members 4C, 54 arranged in the casing 3A and the document cover 4. The one pair of sensor members 4C, 54 are arranged in opposite surfaces of the casing 3A and the document cover 4 in a position, closer to a peripheral edge and of another edge other than the one edge, where is off the first and second platens 27, 11C. Since the cover sensor 63 is arranged to a position nearby a position where the stationary image sensor 22 is configured to be arranged, it is possible to accurately detect that the document cover 4 is in the open state. Specifically, it is possible to accurately detect that the stationary image sensor 22 is improper in status for reading the white reference member.

In the meanwhile, although the mode was disclosed that the document cover 4 to upwardly turn around a document being conveyed from below, it may be configured inverted up and down.

What is claimed is:

1. An image reading apparatus comprising:
a document table configured to support a document;
a cover configured to be movable between a first position for opening the document table and a second position for covering the document table;
a reader unit that supports the document table, the cover being attached to the reader unit to be openable and closable;
a conveyor disposed to the cover and comprising a conveyance mechanism configured to convey a document along a predetermined conveyance path;
a first platen attached to and movable with the cover and configured to come into contact with a first side of the document conveyed by the conveyance mechanism;
a first presser that is attached to the reader unit and disposed below the first platen so as to face the first platen through the conveyance path and is configured to press a second side of the document, which is conveyed by the conveyance mechanism, toward the first platen;
a movable reading device configured to read an image of the document placed on the document table while moving below the document table;
a stationary reading device that is disposed above the first platen and is configured to read an image of the document conveyed by the conveyance mechanism; and
a first urging member configured to urge the first presser toward the first platen,
wherein the first platen moves away from the first presser as the cover is moved toward the first position.

2. The image reading apparatus according to claim 1, wherein the first urging member is disposed at one point for the first presser.

3. The image reading apparatus according to claim 1, wherein the movable reading device comprises:
a second platen configured to come into contact with the second side of the document conveyed by the conveyance mechanism; and
a second presser that is disposed above the second platen and is configured to press the second side of the document, which is conveyed by the conveyance mechanism, toward the second platen,
wherein when reading images on both sides of the document conveyed by the conveyance mechanism, the movable reading device moves below the second platen,
wherein the image reading apparatus further comprises a second urging member configured to urge the second presser toward the second platen, and
wherein the second platen and the second presser are configured to be spaced from each other when the cover is moved to the first position.

4. The image reading apparatus according to claim 3, further comprising:
a white reference member that is disposed on a surface of the first presser facing the first platen, the stationary reading device being configured to use the white reference member for performing various corrections;
a detector configured to detect an open/close state of the cover relative to the document table; and
a control device configured to, in a case where the cover is detected to be open relative to the document table, control the image reading apparatus not to perform the various corrections.

5. The image reading apparatus according to claim 4, further comprising:
a reader housing that houses the document table and the movable reading device,
wherein the cover is swingably supported on the reader housing about a rotation axis extending along a first edge of the reader housing, and
wherein the detector is disposed to the reader housing at a position closer to the second platen than the document table, the position being around a second edge other than the first edge and being away from the first platen and the second platen.

6. The image reading apparatus according to claim 3, wherein each of the first presser and the second presser is made up of a common component.

7. The image reading apparatus according to claim 4, wherein each of the first presser and the second presser is made up of a common component.

8. The image reading apparatus according to claim 3, wherein the second platen and the document table are made up of single member.

9. The image reading apparatus according to claim 4, wherein the second platen and the document table are made up of single member.

10. The image reading apparatus according to claim 1, further comprising:
   a second platen configured to come into contact with the second side of the document conveyed by the conveyance mechanism;
   a second presser that is disposed above the second platen and is configured to press the second side of the document, which is conveyed by the conveyance mechanism, toward the second platen; and
   a second urging member,
   wherein the first urging member is disposed below the first presser and is configured to urge the first presser toward a first direction, and
   wherein the second urging member is disposed above the second presser and is configured to urge the second presser toward a second direction that is opposite to the first direction.

11. The image reading apparatus according to claim 10, wherein the cover comprises a holder frame configured to hold first platen so as to be inclined with respect to the second platen.

12. The image reading apparatus according to claim 10, wherein the conveyance mechanism comprises a turnaround drive roller, and
   wherein the first urging member is disposed between the turnaround drive roller and the second platen.

* * * * *